United States Patent Office 3,001,861
Patented Sept. 26, 1961

---

3,001,861
METHOD FOR DESTRUCTION OF WEEDS
Adolf Fischer, Mutterstadt, Pfalz, Guenter Scheuerer and Otto Schlichting, Ludwigshafen (Rhine), and Herbert Stummeyer, Mannheim, Germany, assignors to Badische Anilin- & Soda-Fabrik Aktiengesellschaft, Ludwigshafen (Rhine), Germany
No Drawing. Filed Dec. 6, 1957, Ser. No. 700,946
Claims priority, application Germany Dec. 14, 1956
3 Claims. (Cl. 71—2.6)

This invention relates to methods for killing or preventing weeds, or undesirable plant growth, and to compositions employed in practicing such methods.

It is already known to use trisubstituted urea derivatives as herbicides (U.S. patent specification No. 2,655,445). It is also already known that cyclohexyl derivatives of urea of the general formula:

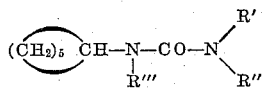

in which R', R" and R'" represent hydrogen, an alkyl group containing 1 to 8 C atoms, or an alkenyl group, have herbicidal activity (U.S. patent specification No. 2,661,272). This activity is unsatisfactory both as a total herbicide and as a preemergence herbicide. Attempts to improve the inadequate activity of these substances by varying the radicals R', R" and R'" have been unsuccessful. Even the replacement of the cyclohexyl radical hitherto exclusively described by cycloaliphatic radicals with a smaller number of carbon atoms, for example by a cyclo-pentyl radical, has given no improvement but in most cases a considerable diminution in the herbicidal activity.

We have now found, surprisingly, that compounds having an economically exploitable herbicidal activity are obtained by replacing the cyclohexyl radical in the said urea derivatives by the cycloheptyl or cyclo-octyl radical. The following table illustrates the variation in the total herbicidal action when the cyclohexyl radical is replaced by the cyclopentyl, cycloheptyl and cyclo-octyl radicals. The figures given relate to the total herbicidal action of the said substances with an amount of active substance of 15 kilograms per hectare in each case:

| | Percent |
|---|---|
| 1-cyclopentyl-3.3-dimethylurea | 15 to 20 |
| 1-cyclohexyl-3.3-dimethylurea | 55 to 60 |
| 1-cycloheptyl-3.3-dimethylurea | 90 to 95 |
| 1-cyclo-octyl-3.3-dimethylurea | 100 |

The compounds of the general formula:

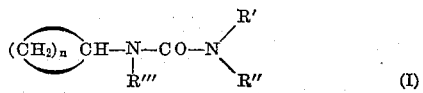

in which $n$ has the value 6 or 7, R', R" and R'" represent hydrogen or an alkyl, alkenyl or aryl group and R' and R" may also be part of a common ring, have hitherto not been described. They may be prepared by methods which are known per se.

Thus by reacting cycloheptylamine or cyclo-octylamine of the Formula II in which $n$ is equal to 6 or 7 with phosgene, the corresponding isocyanates of the Formula III ($n=6$ or 7) are obtained which in turn react with primary or secondary amines with the formation of the urea derivatives of the Formula I:

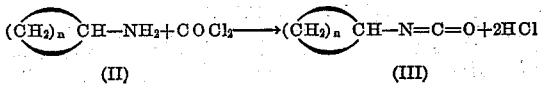

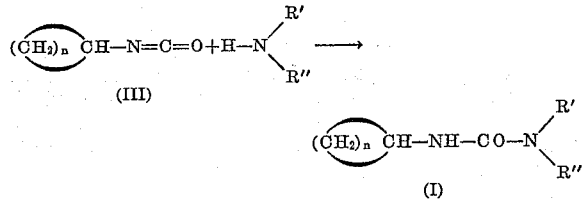

Suitable initial materials for the reaction are the hydrochlorides of cycloheptylamine and cyclo-octylamine which may be reacted in an inert solvent, such as dry benzene, toluene, xylene, dioxane, cyclohexane, phenol ethers, ethyl acetate and the like, with phosgene, preferably at temperatures above 50° C. The reaction of the cycloheptyl and cyclo-octyl isocyanates with primary or secondary amines, as for example, methyl-, ethyl-, butyl-, dimethyl-, diethyl-, methylbutyl-, dicyclohexyl-amine, methylaniline, pyrrolidine, piperidine or morpholine, may also occur in the same solvents, temperatures between 0° and 100° C. usually being sufficient. The working up is dependent on the kind of substituted urea and the choice of solvent.

The compounds of the general Formula I are insoluble in water; they are mainly obtained in crystalline form and can be purified by recrystallization; in so far as they are obtained in the form of oils they can be distilled in vacuo.

The procedure may however, also be that carbamic acid chlorides of the Formula IV are prepared from secondary amines with phosgene and these are reacted with cycloheptylamines or cyclo-octylamines of the Formula V in which $n$ is equal to 6 or 7:

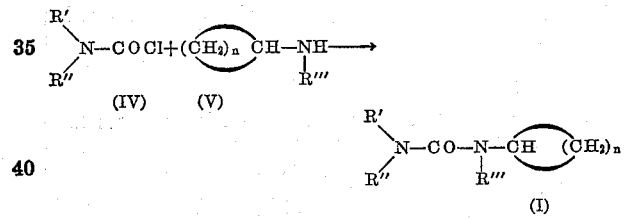

The initial materials and solvents are the same as in the preparation described above. In the presence of an acid acceptor, such as pyridine, triethylamine, dialkylaniline or quinoline, the reaction proceeds at temperatures between 0° and 100° C. It is also possible, however, to use an excess of the amines of the Formula V concerned. For working up, the reaction mixture is poured into acidified water after distilling off the solvent, the urea derivatives of the general Formula I thus occurring in crystalline form or as extractable oils.

Compounds of the general Formula I can also be obtained by consecutively replacing the two NH$_2$-groups of urea by substituted amines according to the following equations:

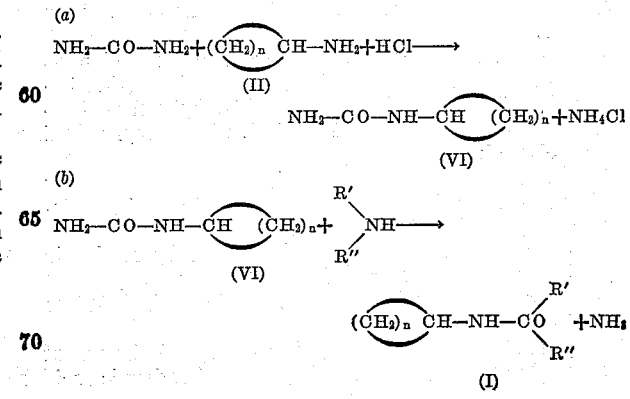

Reaction (a) takes place in aqueous hydrochloric acid solution at temperatures above 75° C. The monosubstituted urea of the Formula VI (in which n=6 or 7) can readily be separated by filtration by suction from the ammonium chloride dissolved in water. The reaction (b) requires temperatures above 150° C. and may be carried out in high boiling point solvents, such as nitrobenzene, dichlorbenzene, phenol ethers. The more highly substituted urea derivatives of the Formula I are more readily soluble in these solvents than the monosubstituted ureas of the Formula VI and can therefore be separated therefrom.

The parts specified in the following prescriptions are parts by weight.

PRESCRIPTION A

Dry halogen chloride is led into a solution of 127 parts of cyclo-octylamine in 410 parts of dry dioxane at room temperature until the whole of the amine has been converted into the hydrochloride. Then dry phosgene is led into the solution kept at 90° C. until the color of the solution has changed to yellow-brown, which requires about 2 to 3 hours. After distilling off about 100 parts of dioxane (whereby the excess of phosgene and hydrogen chloride are removed), dimethylamine is led into the solution of the cyclo-octyl isocyanate formed at room temperature until it is saturated and the reaction mixture kept at 50° C. for 1 hour after the end of the introduction; it is then allowed to cool and the precipitated 1-cyclo-octyl-3.3-dimethylurea is filtered off by suction, suspended in water and after repeated filtration by suction dried in a vacuum drying cabinet at 60° C. If necessary the compound can be recrystallized from cyclohexane. 168 parts of 1-cyclo-octyl-3.3-dimethylurea of the melting point 137° to 137.5° C. are obtained.

From 54 parts of cycloheptylamine in 550 parts of dry dioxane there are obtained by the same process 56 parts of 1-cycloheptyl-3.3-dimethylurea which has a melting point of 152° to 153° C. when recrystallized from dilute alcohol.

PRESCRIPTION B

About 300 parts of dry phosgene are led at room temperature into 1000 parts of dry dioxane, and while continuing to lead phosgene through, there is allowed to drip into the said solution a solution consisting of 190 parts of cyclo-octylamine and 100 parts of dry dioxane. The temperature is kept below 40° C. by cooling. After the end of the addition of the solution, the reaction mixture is heated up to 90° C., the introduction of phosgene ended and the reaction mixture kept at 90° C. until no further hydrogen chloride is disengaged. After distilling off the solvent, 169 parts of cyclo-octyl isocyanate pass over as a colorless liquid at 105° C. under 21 mm./Hg pressure.

26 parts of dicyclohexylamine dissolved in 25 parts of dry dioxane are dripped at room temperature into a solution of 20 parts of cyclo-octyl isocyanate and 100 parts of dioxane. After the end of the addition, the reaction mixture is kept for ½ to 1 hour at 50° C. and then allowed to cool and poured into water. After filtration by suction and drying, 42 parts of 1-cyclo-octyl-3.3-dicyclohexylurea are obtained, which melts at 156° to 157° C.

By the same process there are obtained from 20 parts of cyclo-octyl isocyanate and 20 parts of N-ethyl-orthotoluidine: 21 parts of 1-cyclo-octyl-3-ethyl-ortho-toluylurea which melts at 162° to 163° C. when recrystallized from alcohol;

From 20 parts of cyclo-octyl isocyanate and 20 parts of cyclo-octylamine: 20 parts of 1-cyclo-octyl-3-cyclo-octyl-urea which melts at 185° to 186° C.;

From 20 parts of cyclo-octyl isocyanate by passing in gaseous methylamine until it is saturated: 22 parts of 1-cyclo-octyl-3-methylurea of the melting point 132° to 133° C.;

From 20 parts of cyclo-octyl isocyanate and 13 parts of morpholine: 28 parts of N-cyclo-octyl-carbamic acid morpholide which has a melting point of 158° to 159° C. when recrystallized from benzene and cyclohexane in the ratio 1:1;

From 20 parts of cyclo-octyl isocyanate and 13 parts of piperidine: 26 parts of N-cyclo-octyl-N'.N'-pentamethylurea which melts at 138° to 139° C. when recrystallized from cyclohexane; and From 20 parts of cyclo-octyl isocyanate and 8 parts of pyrrolidine: 19 parts of N-cyclo-octyl-N'.N'-tetramethylurea which has a melting point of 150° to 151° C. when recrystallized from cyclohexane.

PRESCRIPTION C 20 parts of cyclo-octyl isocyanate are reacted with 20 parts of diethylamine in the way described in Prescription B. After pouring the reaction mixture into water and acidifying with dilute hydrochloric acid, the oily layer formed is extracted with ether, dried with sodium sulfate and subjected to vacuum distillation. 24 parts of 1-cyclo-octyl-3,3-diethylurea are obtained which boils at 150° C. under a pressure of 0.2 mm./Hg. The compound becomes solid upon standing and melts at 68° C.

By the same process there are obtained:

From 20 parts of cyclo-octyl isocyanate and 34 parts of dibutylamine: 22 parts of 1-cyclo-octyl-3,3-dibutylurea which boils at 162° to 163° C. under a pressure of 0.4 mm./Hg and melts at 67° C.;

From 20 parts of cyclo-octyl isocyanate and 16 parts of methylaniline: 18 parts of 1-cyclo-octyl-3-methyl-3-phenylurea with the boiling point 149° C. at a pressure of 0.05 mm./Hg; and from 20 parts of cyclo-octyl isocyanate and 15 parts of ethylbutylamine: 13 parts of 1-cyclo-octyl-3-ethyl-3-butyl-urea which boils at 144° C. under a pressure of 0.1 mm./Hg.

PRESCRIPTION D 240 parts of urea are dissolved in 520 parts of water and 127 parts of cyclo-octylamine added thereto. Into the resultant emulsion there are dripped at the boiling temperature of the water 200 parts of concentrated hydrochloric acid and the solution, which is now clear, is heated for 5 hours at 100° C. It is allowed to cool, filtered by suction, washed with water and recrystallized from dilute alcohol. 113 parts of 1-cyclo-octylurea of the melting point 179° to 180° C. are obtained.

113 parts of 1-cyclo-octylurea are suspended in 400 parts of ortho-dichlorbenzene; the suspension is heated to 80° C. and dimethylamine led into it. While further leading in dimethylamine, it is then heated to refluxing temperature and the reaction mixture kept for another 5 hours at a temperature of 170° to 180° C.

The solvent is evaporated in vacuo and the solid residue recrystallized from cyclohexane. 70 parts of 1-cyclo-octyl-3.3-dimethylurea of the melting point 136° to 137° C. are obtained; it is identical with the product described in Prescription A.

PRESCRIPTION E 53 parts of dimethylcarbamic acid chloride are dissolved in 250 parts of dry chloroform and 100 parts of dry pyridine are added thereto; 50 parts of cyclo-octylamine are allowed to drip into this mixture at room temperature and boiled for 2 hours under reflux. After distilling off the chloroform, water is added and it is acidified with dilute hydrochloric acid. 65 parts of 1-cyclo-octyl-3.3-dimethylurea of the melting point 136° to 137° C. are obtained which is identical with the product described in Prescription A.

The activity of the herbicides according to this invention is illustrated by the following examples:

Example 1

1-cyclo-octyl-3.3-dimethylurea is used in the greenhouse in amounts of 2.5, 5 and 10 kilograms per hectare in 1,200 litres of water with the following plants: *Sinapis alba, Avena sativa, Poa annua, Galium aparine, Galin-*

*soga parviflora* and *Polygonum persicaria*. The beginning of the toxic action of the agent can be observed at the tips of the leaves of the plants even after 1 or 2 days. After about 10 days the plants are practically completely withered.

*Example 2*

A row of oats and a row of mustard are sown in sandy earth in each of two clay dishes of an area 25 x 30 centimetres. An aqueous solution of cyclo-octyldimethylurea prepared with the addition of a dispersing agent is sprayed onto the earth in such amounts that they correspond in one clay dish to 2 kilograms and in the other clay dish to 5 kilograms of active substance per hectare. At first the oats and mustard seedlings develop normally. After 5 to 7 days, chlorotic phenomena occur especially at the leaf tips, and after 2 or 3 weeks the young plants are completely destroyed. A fresh sowing with oats and mustard seed is carried out after a further 3 weeks in the same earth which has been treated 6 weeks previously with cyclo-octyldimethylurea. The new plantlets are also completely withered 2 to 3 weeks after sprouting.

*Example 3*

An agricultural working area which is strongly infested with the weeds; *Galinsoga parviflora, Raphanus raphanistrum, Sinapis arvensis, Atriplex patulum, Stellaria media, Chamomilla matricaria, Polygonum persicaria,* and *Panicum sanguinale,* is sprayed with cyclo-octyldimethylurea in an amount of 15 kilograms per hectare in 1,000 litres of water. The weeds are completely destroyed after 3 to 4 weeks. A new sowing of oats and mustard seed after about 4 months shoots completely and grows normally.

*Example 4*

On waste land, perennial grasses, dandelion, yarrow, plantain and clover are sprayed, for purposes of comparison, with 1-cyclo-octyl-3.3-dimethylurea, 1-cyclo-heptyl-3.3-dimethylurea, 1-cyclohexyl-3.3-dimethylurea and 1-cyclopentyl-3.3-dimethylurea, in each case in an amount of 15 kilograms per hectare in 1,200 litres of water. After 5 weeks the following percentages are determined for the weed-killing action of the urea derivatives used:

|  | Percent |
|---|---|
| Cyclo-octyl-dimethylurea | 100 |
| Cycloheptyl-dimethylurea | 90 to 95 |
| Cyclohexyl-dimethylurea | 55 to 60 |
| Cyclopentyl-dimethylurea | 15 to 20 |

*Example 5*

Carrot and beetroot seeds are sown in an agricultural working area. On the same day cyclo-octyldimethylurea, cyclohexyldimethylurea and para-chlorphenyldimethyl-urea are sprayed on the same area in amounts of 1 kilogram per hectare in 1,000 litres of water. 3 weeks after the sprouting of the cultivated plants, the following comparative appraisement results on an average:

| Substance used | Sproutage of cultivated plants in percent | Sproutage of weeds in percent |
|---|---|---|
| cyclo-octyl-dimethylurea | 100 (slight growth inhibition). | 5 to 15. |
| cyclohexyl-dimethylurea | do | 60 to 65. |
| parachlorphenyl-dimethylurea | 45 to 50 | 0 to 5. |

The weeds which sprout in the control areas are *Atriplex patulum, Chamomilla matricaria, Stellaria media, Capsella bursa pastoris, Spergula arvensis, Senecio vulgaris, Sinapis arvensis, Galinsoga parviflora, Polygonum aviculare, Polygonum persicaria* and annuals, as for example *Poa annua*.

We claim:

1. A method for the destruction and prevention of weeds which comprises applying to a locus to be protected, in an amount sufficient to exert a herbicidal action, a urea derivative represented by the formula

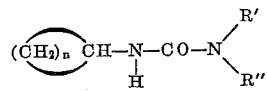

where $n$ is one of the integers 6 and 7 and $R'$ and $R''$ are selected from the group consisting of hydrogen and alkyl having from 1 to 2 carbon atoms.

2. A method as claimed in claim 1 wherein said urea derivative is 1-cyclo-octyl-3.3-dimethyl urea.

3. A method as claimed in claim 1 wherein the urea derivative is 1-cycloheptyl-3.3-dimethyl urea.

References Cited in the file of this patent

UNITED STATES PATENTS

| 2,661,272 | Searle | Dec. 1, 1953 |
| 2,817,684 | Bortnick | Dec. 24, 1957 |